United States Patent
Mishin et al.

(10) Patent No.: US 6,663,698 B2
(45) Date of Patent: Dec. 16, 2003

(54) FUME EXTRACTION APPARATUS AND ASSEMBLY

(75) Inventors: Artem Mishin, San Francisco, CA (US); Mark Cowell, San Carlos, CA (US)

(73) Assignee: Delaware Capital Formation, Inc., Wilmington, DE (US)

(*) Notice: Subject to any disclaimer, the term of this patent is extended or adjusted under 35 U.S.C. 154(b) by 0 days.

(21) Appl. No.: 10/233,787

(22) Filed: Apr. 25, 2002

(65) Prior Publication Data

US 2003/0029321 A1 Feb. 13, 2003

Related U.S. Application Data

(63) Continuation of application No. 10/053,647, filed on Jan. 24, 2002, now abandoned, which is a continuation of application No. 09/434,446, filed on Nov. 5, 1999, now abandoned.

(51) Int. Cl.$^7$ .......................... B01D 53/04; B01D 46/02; B01D 29/11
(52) U.S. Cl. ............................ 96/142; 96/147; 55/320; 55/332; 55/356; 55/471; 55/472
(58) Field of Search .......................... 96/134–136, 139, 96/140, 142, 147; 55/318, 320, 331, 332, 356, 357, 472, 473, 467–471

(56) References Cited

U.S. PATENT DOCUMENTS

| | | | |
|---|---|---|---|
| 3,860,404 A | | 1/1975 | Jochimski |
| 3,898,414 A | * | 8/1975 | Hawley ........................ 219/72 |
| 3,926,104 A | * | 12/1975 | El Dorado .................... 454/65 |
| 4,025,325 A | | 5/1977 | Goodwitt, Jr. |
| 4,163,650 A | | 8/1979 | Watson et al. |
| 4,252,547 A | | 2/1981 | Johnson |
| 4,276,819 A | * | 7/1981 | Goldman et al. ............. 454/56 |
| 4,312,291 A | | 1/1982 | Knab |
| 4,339,250 A | | 7/1982 | Thut |
| 4,361,427 A | | 11/1982 | Barradas |
| 4,370,155 A | | 1/1983 | Armbruster |
| 4,377,399 A | | 3/1983 | Bryson |
| 4,385,911 A | | 5/1983 | Popeil et al. |

(List continued on next page.)

FOREIGN PATENT DOCUMENTS

WO    WO 98/14858 A2    9/1998

OTHER PUBLICATIONS

18/Electronic Packaging & Production, Product & Equipment News, "Fume Extractor" and "EMI Shields".

OK Industries (UK) Ltd., "Solder Fumes", Pur–Air Extraction & Purification Systems, Mar. 1996, pp. 1–20.

Pace Technical Note and Application Guide, pp. from 72–77, 81, and unnumbered "Why You Need Fume Extraction".

Pace, "Price Book, Fume Extraction Systems", Jan. 1, 1997, pp. 4–12 and 20–21.

Pace Fume Extraction, "Multi Ar–Evac II Systems", pp. 1–6.

*Primary Examiner*—Robert H. Spitzer
(74) *Attorney, Agent, or Firm*—Burns, Doane, Swecker & Mathis, L.L.P.

(57) ABSTRACT

A fume extraction and filter apparatus includes a housing including a base and a top portion connected to a top side of the base. The base includes an inlet in a side thereof, the inlet leading into the housing and being in flow communication with an outlet in the top portion. A motor is disposed in the housing. A blower assembly is disposed in the housing and drivable by the motor to draw air into the inlet and cause the air to exit through the outlet. A filter is disposed in the housing between the inlet and the outlet and is arranged to filter air drawn in the inlet before the air exits through the outlet.

31 Claims, 5 Drawing Sheets

U.S. PATENT DOCUMENTS

| | | |
|---|---|---|
| 4,512,245 A | 4/1985 | Goldman |
| 4,617,033 A * | 10/1986 | Strang .............................. 96/1 |
| 4,647,295 A * | 3/1987 | Christ ........................ 95/284 |
| 4,875,914 A * | 10/1989 | Wireman .................... 96/136 |
| 4,900,344 A * | 2/1990 | Lansing ...................... 55/322 |
| 4,900,346 A * | 2/1990 | Lutz ............................ 96/142 |
| 5,129,928 A * | 7/1992 | Chan et al. .................. 95/273 |
| 5,223,005 A * | 6/1993 | Avondoglio ................. 95/280 |
| 5,226,939 A * | 7/1993 | Nicolas et al. ................ 55/309 |
| 5,264,026 A * | 11/1993 | Paul ............................ 95/268 |
| 5,266,090 A * | 11/1993 | Burnett ........................ 55/333 |
| 5,268,012 A | 12/1993 | Jang |
| 5,305,494 A * | 4/1994 | Candler ....................... 15/304 |
| 5,358,443 A * | 10/1994 | Mitchell et al. ............ 454/230 |
| 5,443,625 A | 8/1995 | Schaffhausen |
| 5,641,343 A | 6/1997 | Frey |
| 5,702,493 A | 12/1997 | Everetts et al. |
| 5,753,000 A | 5/1998 | Chiu et al. |
| 5,837,020 A | 11/1998 | Cartellone |
| 5,997,619 A | 12/1999 | Knuth et al. |

\* cited by examiner

FUME EXTRACTION APPARATUS AND ASSEMBLY

This application is a continuation of application Ser. No. 10/053,647 filed on Jan. 24, 2002 (now abandoned), which was a continuation of application Ser. No. 09/434,446, filed Nov. 5, 1999 (now abandoned).

FIELD OF THE INVENTION

The present invention relates to fume extraction and filter apparatus and, more particularly, to a portable fume extraction and filter apparatus.

BACKGROUND AND SUMMARY

It is common to provide fume extraction apparatus to remove fumes from workstations at which fumes tend to be generated, such as chemical, soldering, and other workstations. Fume extraction apparatus are provided in several categories. One category of fume extraction apparatus is occasionally referred to as a tip extraction apparatus typically used in applications such as soldering for removing solder fumes substantially at their source. In tip extraction apparatus, a vacuum draws air through a small diameter tube attached to the tip of, for example, a hand-held soldering iron. Tip extraction apparatus are primarily useful for applications in which relatively small amounts of fumes are generated.

Another category of fume extraction apparatus is an arm extraction system in which air is drawn from a workstation through a relatively large diameter duct. Arm extraction systems come in a range of sizes but, as a general rule, pull large volumes of air away from workstations. The arms are typically adjustable to adapt to specific fume extraction needs.

Smaller arm extraction systems typically include an arm connected to a remote vacuum and filter apparatus. In smaller arm extraction systems, it has, in the past, been difficult to achieve desired volume flow rates and adequate pressures required for adequate filtration without making the systems excessively bulky and noisy. Prior art remote arm extraction systems are either so large that they must be provided with a wheeled cart to permit moving the systems from one location to another, or too ineffective for many fume extraction uses.

Larger arm extraction systems typically include an arm or stationary hood at the workstation connected by ductwork to a remote vacuum arrangement. The vacuum arrangement is typically highly oversized to permit use of a single vacuum and filter apparatus for multiple workstations, and to permit modification of the fume extraction apparatus to include additional ductwork for further workstations. Benefits of the larger apparatus include the ability of the apparatus to draw large volumes of air through high efficiency filters, and remote positioning of noise making components such as blower assemblies and motors to minimize the noise level at the remote work area.

An obvious drawback to the fume extraction apparatus with remote vacuum and filter arrangements is that they are not conveniently adaptable to different situations. For example, it is often necessary to extract fumes from a location remote from the arm or stationary hood. Without providing the extensive ductwork necessary to connect up to the vacuum, the fume extraction apparatus is substantially useless in such situations. Obviously, it is not always possible or practical to provide ductwork for fume extraction in all situations.

Another drawback to apparatus with remote vacuum and filter arrangements is that they tend to be inefficient. Because the vacuum is typically oversized to permit expansion of the fume extraction apparatus, the vacuum is rarely optimally sized for a particular application. As a result, energy is wasted, and more expensive equipment is used than is necessary. Moreover, because most conventional fume extraction apparatus include AC motors designed to operate at frequencies of 60 cycles/sec. in the U.S. or at frequencies of 50 cycles/sec. in many European countries, they do not perform efficiently when used with power supplies other than those for which they were specifically designed. When used with conventional U.S. power supplies, a two pole AC motor will be limited to operating at 3600 rpm. While AC motors can be operated at higher speeds when provided with specially adapted variable frequency power supply that provide power at higher frequencies than conventional power supplies, this adds undesirable expense to systems incorporating AC motors. It is desirable to provide a portable fume extraction apparatus that is capable of operation at high speeds without the need for providing specially adapted variable frequency power supply.

Yet another drawback to apparatus with remote vacuum and filter arrangements is that they tend to be quite large, yet may only be needed to extract fumes from a limited area. As a result, space that could be used more profitably for other purposes is wasted for the fume extraction apparatus.

In addition to conventional fume extraction apparatus of the type having ductwork extending between a workstation and a vacuum, various other forms of self-contained fume extraction apparatus are known. Well-known examples of self-contained fume extraction apparatus are the table or floor mounted air cleaners that are occasionally used for extracting non- or minimal hazard fumes such as tobacco smoke from rooms. These apparatus are typically very light duty. They typically have inlets through which air is drawn by a motor-driven blower assembly inside of a housing of the apparatus, a filter through which the air is passed after being drawn inside of the housing, and outlets through which the air is directed after passing through the filter.

Generally speaking, smaller fume extraction apparatus are not suited for applications for which larger fume extraction apparatus with remote vacuums and filters are used. Because their size must be limited, for example, to volumes preferably about 1 ft$^3$ (0.03 m$^3$) or less for convenient portability, to footprints of less than about 100 in$^2$ (0.70 ft$^2$, 0.965 m$^2$) to only minimally obstruction of space, and to heights of no more than about 14" (0.35 m) for use with many commercially available, prefabricated workbench units, prior to the present invention, small, self-contained fume extraction apparatus required large motors and/or ineffective, low pressure-drop filters to move the comparable volumes of air to the volumes moved by larger fume extraction apparatus per workstation. Typically, as filter effectiveness increases, so does the amount of pressure drop across the filter, and the size of the motor and blower assembly arrangement necessary to overcome the pressure drop increases. As a practical matter, motor size and filter effectiveness have been such limiting characteristics of smaller, self-contained fume extraction apparatus that, when built in any conveniently portable size, they simply are incapable of providing a fume extraction and filtering effect comparable to that capable of being provided by conventional stationary fume extraction apparatus.

Another drawback to known self-contained fume extraction and filtering apparatus is that, when of sufficient size to move air in volumes per unit time comparable to the volumes moved by conventional stationary apparatus at a single workstation, the self-contained apparatus tend to be quite noisy. The noise is typically a result of the operation of a large motor and rotation of components of the blower assembly. Because the self contained fume extraction and filtering apparatus are intended to be located where the people using them are also located, noise levels must be kept low. As a consequence of this aspect, most self-contained fume extraction and filtering apparatus are sufficiently small so that operation of the motor and rotation of the blower assembly components keeps noise at an acceptably low level. Because motor size and blower assembly speeds or sizes are limited, these structures have the effect of limiting the amount of air that can be drawn through the apparatus and the effectiveness of the filter that can be used.

No fume extraction apparatus prior to the present invention is known that is conveniently portable as well as capable of drawing a sufficient volume of air from a workstation and through a highly effective filter. It is desirable to provide a fume extraction and filtering apparatus that is conveniently portable and capable of drawing a sufficient volume of air from a workstation and through a highly effective filter. It is, moreover, desirable to provide such a self-contained fume extraction and filtering apparatus that operates at sufficiently low noise levels to be located at a workstation. Embodiments of the present invention permit providing a portable and self-contained apparatus usable with highly effective filters, and capable of operation at low noise levels as compared with prior art apparatus capable of filtering comparable volumes of air.

According to one aspect of the present invention, a fume extraction and filter apparatus includes a housing including a base and a top portion connected to a top side of the base. The base includes an inlet in a side thereof, the inlet leading into the housing and being in flow communication with an outlet in the top portion. A motor is disposed in the housing. A blower assembly is disposed in the housing and drivable by the motor to draw air into the inlet and cause the air to exit through the outlet. A filter is disposed in the housing between the inlet and the outlet and is arranged to filter air drawn in the inlet before the air exits through the outlet.

According to another aspect of the present invention, a fume extraction and filter apparatus assembly includes a fume extraction and filter apparatus and a duct assembly. The fume extraction and filter apparatus includes a housing including a base and a top portion connected to a top side of the base. The base includes an inlet in a side thereof, the inlet leading into the housing and being in flow communication with an outlet in the top portion. A motor is disposed in the housing. A blower assembly is disposed in the housing and drivable by the motor to draw air into the inlet and cause the air to exit through the outlet. A filter is disposed in the housing between the inlet and the outlet and is arranged to filter air drawn in the inlet before the air exits through the outlet. The dust assembly is attachable to the base.

According to yet another aspect of the present invention, a fume extraction and filter apparatus includes a housing including a side wall having an inlet opening extending from a point above an open bottom of the housing to the bottom of the housing and an inlet leading into the housing and in flow communication with an outlet proximate a top of the housing. The apparatus further includes a motor disposed in the housing, a blower assembly disposed in the housing and drivable by the motor to draw air into the inlet and cause the air to exit through the outlet, and a filter disposed in the housing between the inlet and the outlet and arranged to filter air drawn in the inlet before the air exits through the outlet.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1A:
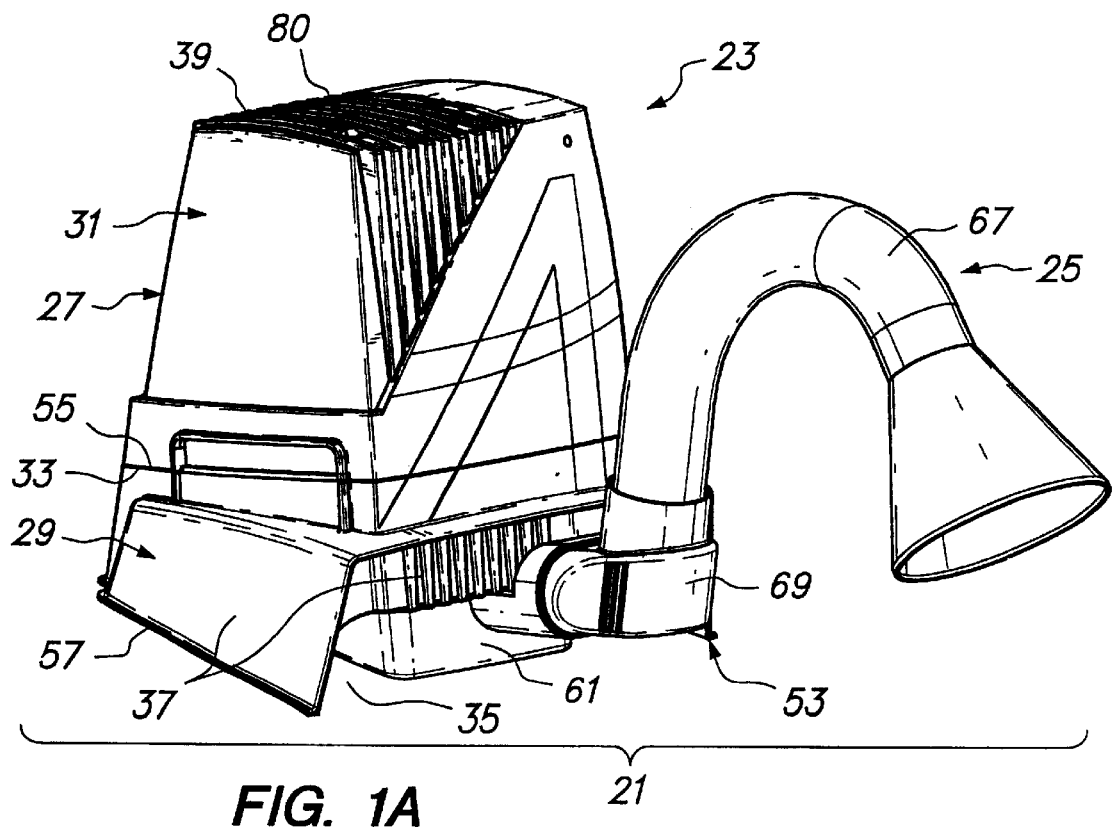
FIGS. 1A and 1B are front perspective views of a fume extraction and filter apparatus assembly and a fume extraction and filter apparatus, respectively, according to embodiments of the present invention.
Figure 1B:
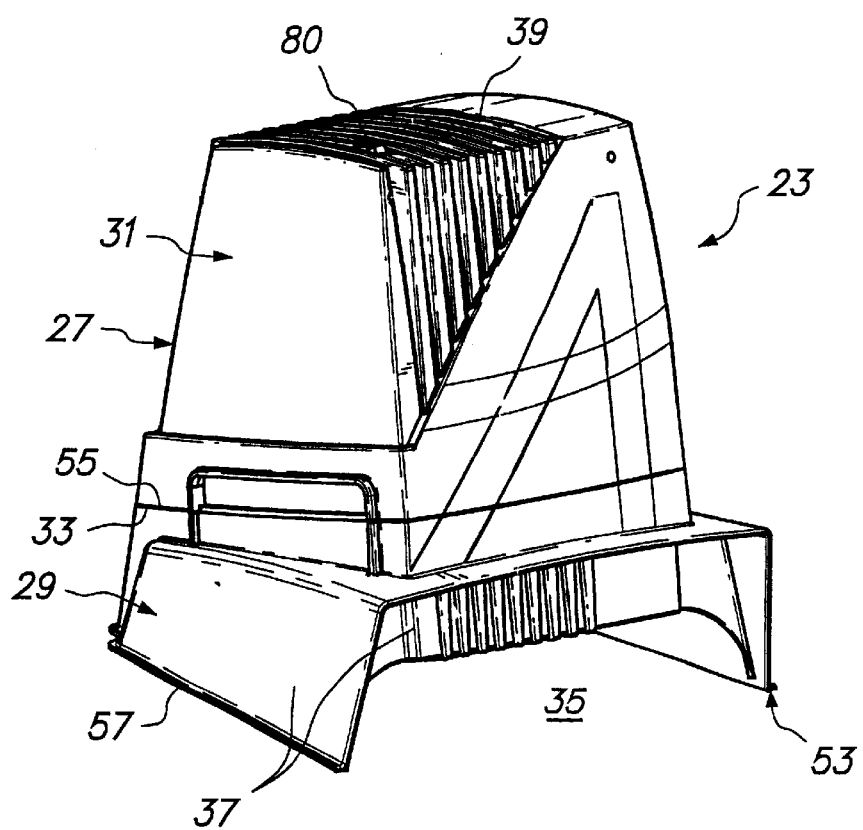
Figure 2A:
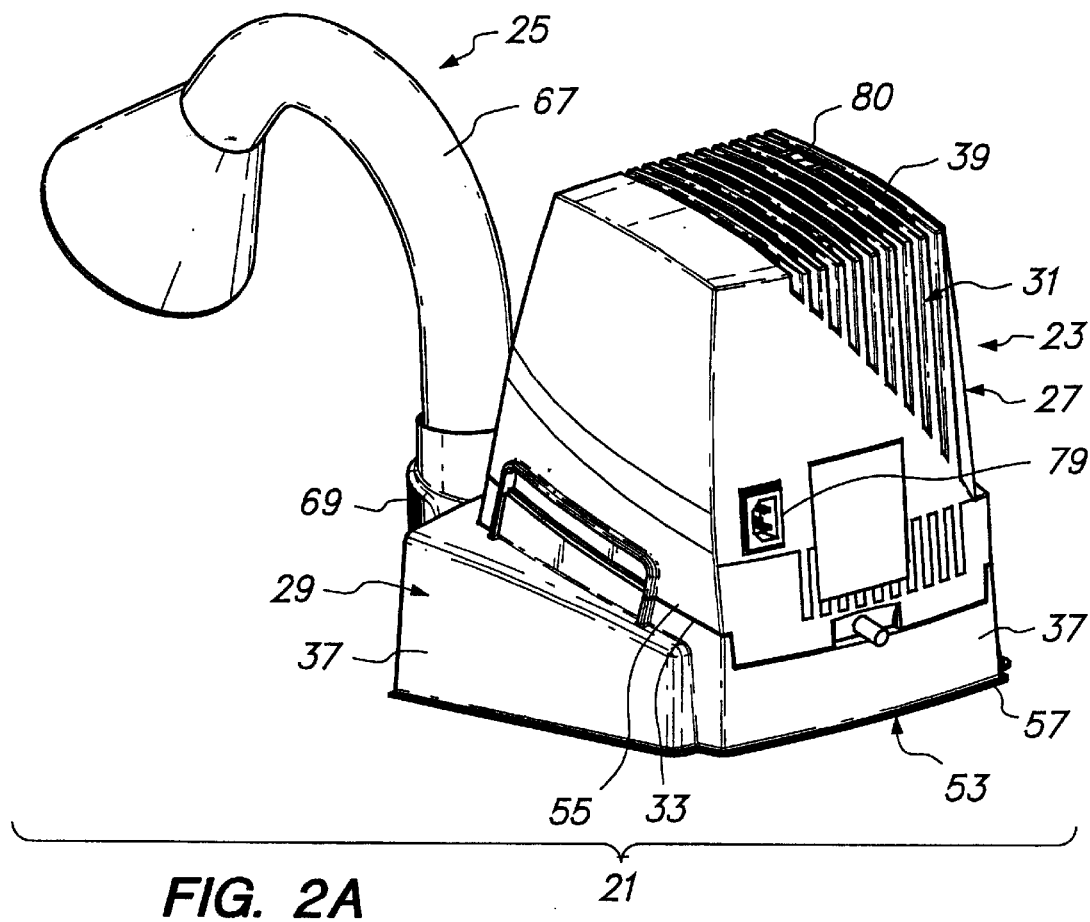
FIG. 2A is a rear perspective view of the fume extraction and filter apparatus assembly of FIG. 1A
Figure 2B:
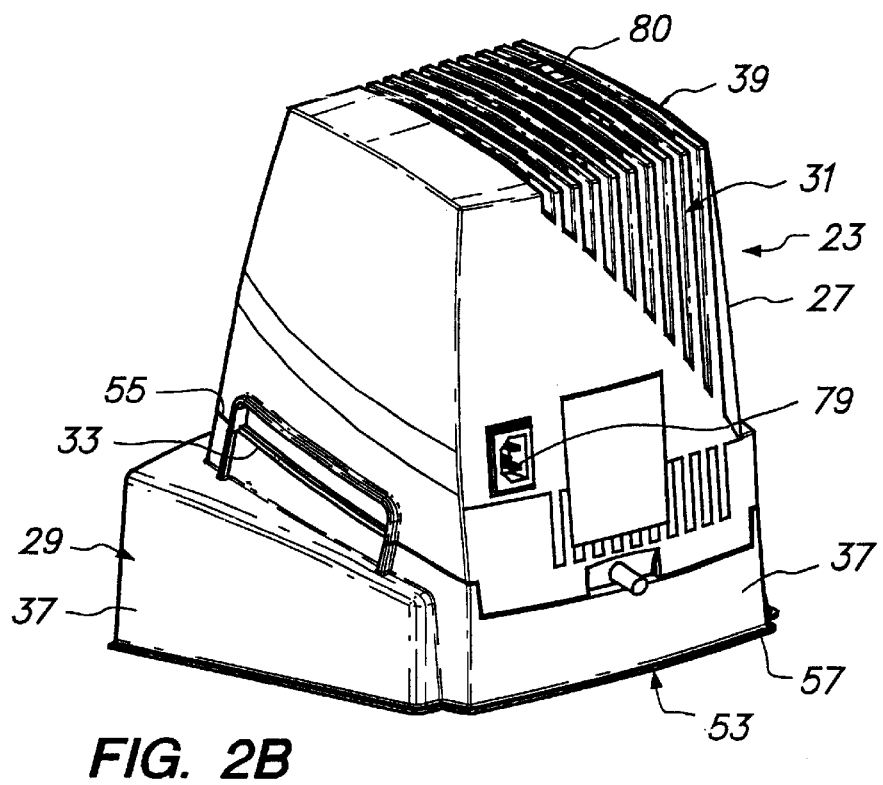
FIG. 2B is a rear perspective view of the fume extraction and filter apparatus of FIG. 1B.

A fume extraction and filter apparatus assembly 21 according to an embodiment of the present invention is shown in FIGS. 1A and 2A. The assembly 21 includes a portable fume extraction and filter apparatus 23 (FIGS. 1B and 2B) and a duct assembly 25. The apparatus 23 may be used separately from the duct assembly 25, if desired or necessary, as seen in FIGS. 1B and 2B. The apparatus 23 and the assembly 21 are preferably sized to conveniently mount on, under, or near a chemical, solder, or other workstation without taking up excessive space at the workstation, and to draw and filter air at a sufficient volume flow rate and to a particulate removal effectiveness capable of meeting applicable occupational safety regulations.

The filter apparatus 23 includes a housing 27 including a base 29 and a top portion 31 connected to a top side 33 of the base. The base 29 includes an inlet 35 or plenum area in a side 37 thereof. The inlet 35 leads into the housing 27 and is in flow communication with an outlet 39 in the top portion 31.

Figure 3:
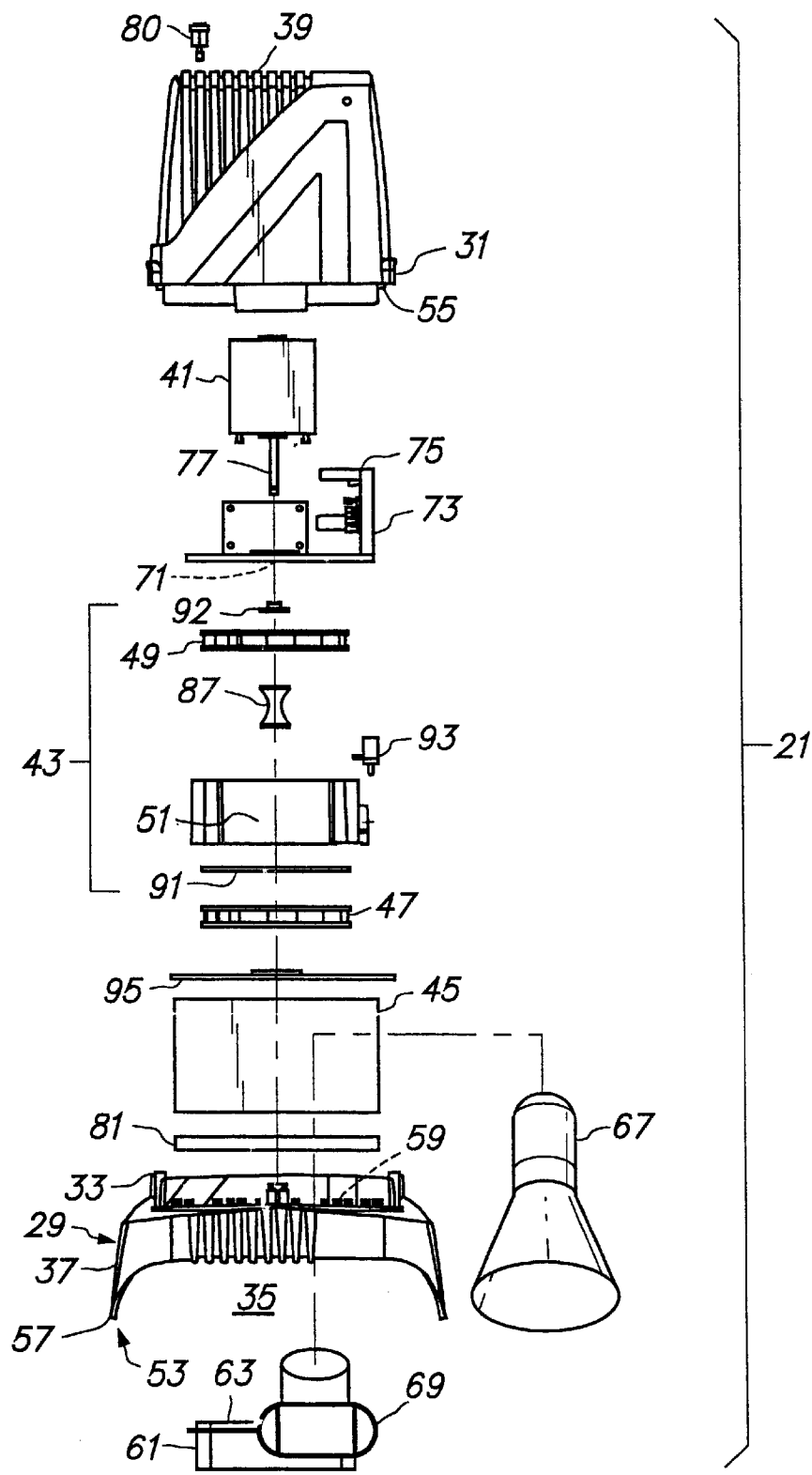
FIG. 3 is an exploded front view of the components of a fume extraction and filter apparatus assembly according to an embodiment of the present invention.
Figure 4:
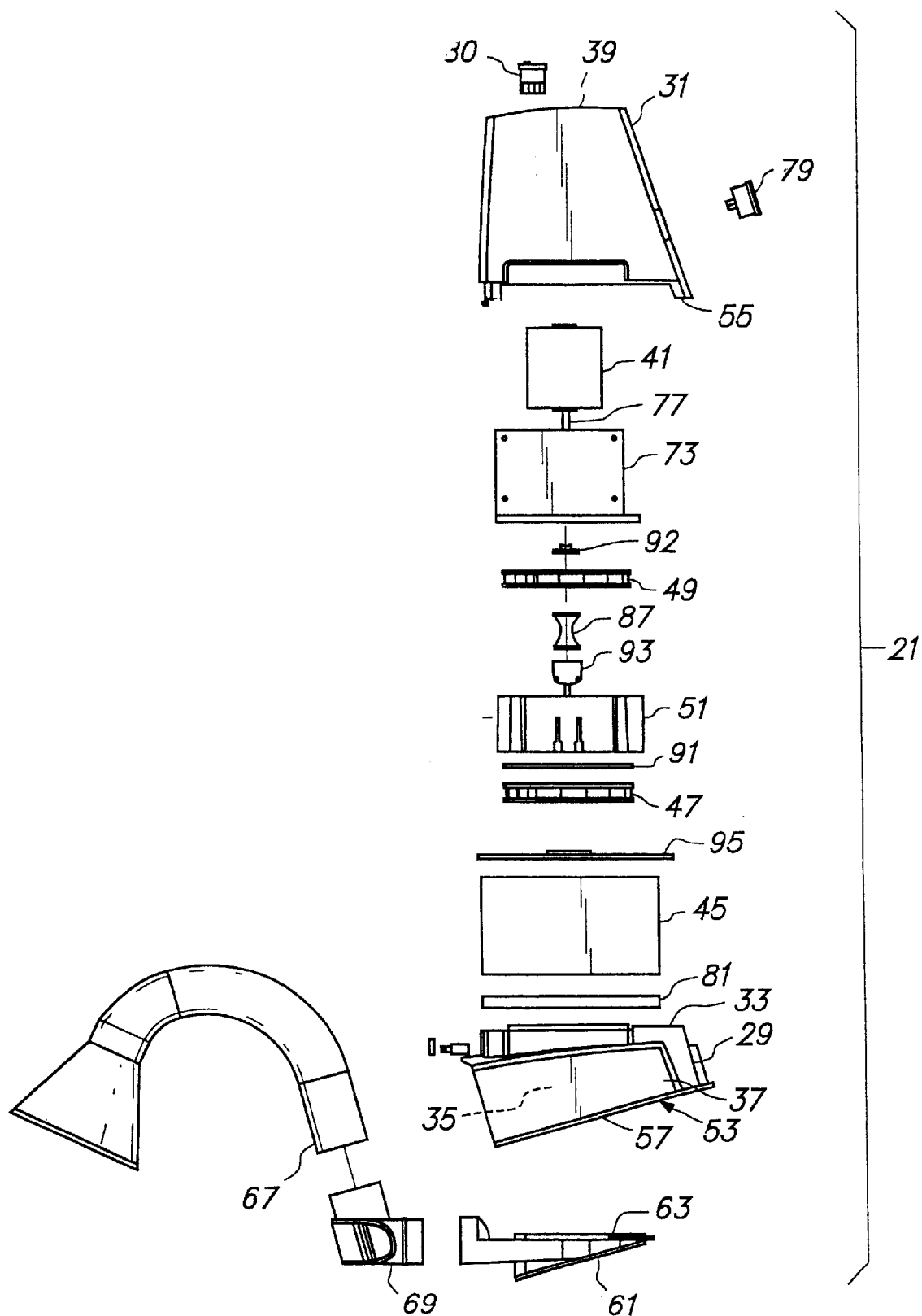
FIG. 4 is an exploded side view of the components of the fume extraction and filter apparatus assembly of FIG. 3.

As seen in the exploded views of FIGS. 3 and 4, a motor 41 is disposed in the housing 27. A blower assembly 43 is also disposed in the housing 27 and is drivable by the motor 41 to draw air into the inlet 35 and cause the air to exit through the outlet 39. A filter 45 is disposed in the housing 27 between the inlet 35 and the outlet 39 and is arranged to filter air drawn in the inlet before the air exits through the outlet.

The components of the apparatus 23 are preferably adapted to draw between about 42–50 CFM of air into the inlet and across a HEPA and active carbon gas filter with a 2" $H_2O$ pressure drop, which is a volume flow rate sufficient for most single-user workstations with which the assembly 21 or the apparatus 23 are presently intended to be used. It will, of course, be appreciated that other volume flow rates may be provided as desired or necessary for particular applications. The components of the apparatus 23 are also preferably arranged to produce no more than 53 dB at 0.5 m (about 20"), a distance believed to be the typical distance from the user's ear to a point at which the fume extractor according to the present invention will be located. Again, the noise level produced by the apparatus 23 can be increased or decreased as desired or necessary. The volume of the apparatus 23 is preferably less than 1 ft³ and, more preferably, the dimensions of the apparatus are preferably approximately 10.5" (27 cm) high×11.5" (29 cm) wide×8.5" (22 cm) deep.

To achieve desired high volume flow rates, low noise levels, and small sizes, the apparatus 23 is preferably provided with features that cooperate to yield a more compact and powerful apparatus than is achieved absent the novel combination. For example, the motor 41 is preferably a DC motor, and the blower assembly 43 is a double-stage blower including an intake impeller 47 and an output impeller 49 disposed on opposite sides of a diverter 51. The intake impeller 47 is closer to the inlet 35 than the output impeller 49 and the output impeller is closer to the outlet 39 than the intake impeller.

The advantageous features of the apparatus 23 are achieved by the combination of features in several ways. By adjusting a blade density, i.e., the number of blades, of the blower assembly 43, the noise level of the blower assembly is adjusted. More particularly, it was discovered that, as more blades are provided on an impeller, the noise produced by rotation of the impeller is reduced. While not wishing to be bound by theory, it is believed that reasons for the reduction in noise resulting from providing more blades on an impeller include that, as additional blades are added, for each rotation of the impeller, each blade moves a smaller volume of air than when fewer blades are provided. The number of blades is preferably selected to simultaneously achieve desired volume flow rates without exceeding desired noise levels. In addition, it was discovered that, as the height of the output and intake impellers 47 and 49 and the diverter 51 are increased, improved flow characteristics are achieved. For example, as height increases, the pressure necessary for adequate filter performance is more easily achieved.

The intake impeller 47 works like a turbocharger. It creates an initial air funnel and forces it into the diverter 51. The diverter 51, in turn, helps to increase the vortex, and forces the air further toward the output impeller 49. The output impeller 49 receives the enhanced airflow and assists in exhausting it. Because the output impeller 49 adds energy to the air flow, there is less backpressure between the blower assembly 43 and the outlet 39 than would be the case if only a single impeller were used and, consequently, a greater vacuum can be generated in the region between the inlet 35 and the blower assembly.

The preferred filter 45 is a HEPA and active carbon gas filter having dimensions of about 7" wide×7" deep×3.5" thick (18 cm wide×18 cm deep×9 cm thick) and a pressure drop of 2" $H_2O$ at volume flow rates below 50 CFM (1.41 m³/min.). At this volume flow rate and pressure drop, the filter 45 preferably will filter 99.997% of all particulates down to 0.3 micron size and meet Class 100 clean room US standards.

The use of a DC motor offers the advantage of a higher power output than a typical AC motor of substantially the same size. Moreover, the use of a DC motor offers the advantage of providing an apparatus that is less susceptible to variations in performance than an AC motor due to differences in input power. For example, performance characteristics of AC motors tend to vary depending upon whether the motor is being used with a conventional U.S. power supply or used with a conventional European power supply. Combining a DC motor 41 with a double stage blower assembly 43 has been discovered to be capable of yielding exceptionally effective air moving equipment requiring a minimum of space while operating at low noise levels. A presently preferred motor is a Model 28099-520022 DC motor available from Fasco, Ontario, Canada. The motor 41 preferably operates at approximately 5000 rpm, 24 V, and less than 65 W, although, due to inefficiencies, greater power may be drawn. The apparatus 23 is preferably provided with a conventional DC power supply for operation of the motor 41.

A preferred embodiment of the intake and output impellers 47 and 49 has fifteen blades, and a diameter of 5" (0.12 m). The entire blower assembly 43, including the diverter 51, preferably has a diameter of about 5.75" (0.15 m). The impellers are preferably molded of smooth polymeric material with substantial rounds and fillets to reduce turbulence and noise. The intake diameter of the input impeller 47 is preferably 2" (0.05 m). When operated with a DC motor at about 5000 rpm, the blower assembly 43 is adapted to draw about 42–50 CFM of air into the inlet and across a HEPA and active carbon gas filter with a 2" $H_2O$ pressure drop. Because the pressures obtainable by a blower assembly are a function of the square of the diameter of the blower assembly and the square of rpm's of the blower assembly, for performance with an AC motor operating at 3600 rpm comparable to performance of the preferred embodiment having a 5" blower assembly diameter operating at 5000 rpm, the diameter of the blower assembly would have to be about 7" (0.18 m).

Moreover, the minimal diameter of the blower assembly 43 permits manufacture of a fume extractor apparatus that preferably has a total volume of less than 1 ft³, a footprint of less than 100 in² (0.70 ft², 0.965 m²), and a height of less than 12" (0.35 m), making the apparatus eminently portable. Because the fume extractor apparatus is preferably less than 14" high (0.35 m), and more preferably less than 12" (0.3 m) high, it is well-suited for use with many commercially available, prefabricated workbench units which are often provided with shelves at the rear of the workstations that are 14"±2" (0.35±0.05 m) above a work surface.

Yet another feature of the apparatus 23 that facilitates the movement of air is the preferred shape of the apparatus. More particularly, the top side 33 of the base 29 on which the top portion 31 is mounted preferably defines a non-zero angle, preferably 15°, with a horizontal bottom side 53 of the base. The motor 41, the blower assembly 43, and the filter 45 are preferably mounted inside of the top portion 31 substantially along a central axis of the top portion. A bottom side 55 of the top portion 31 is preferably substantially flat and, when the bottom side of the top portion is horizontal, the central axis of the top portion is substantially vertical. As a result of the preferred configuration of the top portion 31 and the base 29, the central axis defines the non-zero angle, preferably 15°, to a vertical axis when the bottom side 53 of the base 29 is horizontal. The filter 45 is, likewise, preferably disposed at the non-zero angle, preferably 15°, to the vertical. Because of the tilting of the filter 45 relative to the vertical, a reduced pressure drop occurs across the filter than if the filter were completely vertical. Through this orientation of the filter 45 resulting in a lower pressure drop across the filter, the motor 41 and blower assembly 43 can draw more air through the filter than if the filter were vertical.

The inlet 35 preferably extends to the bottom side 53 of the base 29. The base 29 is preferably substantially square or rectangular when viewed from the bottom side 53, and, when the apparatus 23 is in an upright condition wherein the bottom side of the base faces a horizontal surface, preferably only the rim or bottom edge 57 of the side 37 of the base contacts the horizontal surface. The base 29 is preferably open on the bottom side 53. The inlet 35 preferably comprises the space defined by the side 37 of the base 29 above the bottom side 53 of the base and beneath an opening 59 through the top side 33 of the base leading to the filter 45 in the top portion 31. The opening 59 preferably includes a lip or other structure upon which the filter 45 is seated or otherwise secured.

The duct assembly 25 is attachable to the base 29. The duct assembly 25 preferably includes an attachment portion 61 for attaching the duct assembly to the base 29. The attachment portion 61 is preferably attached to the base 29 when the base is lowered vertically over the attachment portion such that the attachment portion is received entirely inside the inlet 35. A size of the attachment portion 61 is preferably such that, when the base 29 is lowered over the attachment portion, the attachment portion nests within the inlet 35 and is substantially non-movable relative to the base. A top 63 of the attachment portion 61 may seat in a correspondingly-shaped recess proximate a top of the inlet 35 to ensure proper relative positioning of the attachment portion relative to the opening 59. If desired or necessary, locking members such as pins or snaps may be provided to ensure that the attachment portion 61 remains stationary relative to the base 29. Ordinarily, however, the attachment portion 61 will remain stationary relative to the base 29 at least by virtue of the nesting of the attachment portion within the inlet and the weight of the apparatus 23 over the attachment portion. The inlet 35 and the attachment portion 61 are both preferably substantially wedge-shaped when viewed from the side, and substantially square or rectangular when viewed from the top or bottom.

A duct 67 is preferably attached to the attachment portion 61 and facilitates focusing the vacuum created by the apparatus 23 on a particular area remote from the inlet 35. The duct 67 may be movable relative to the attachment portion 61 in the sense of being flexible and/or in the sense of being pivotable and/or rotatable relative to the attachment portion. Preferably the duct 67 is attached to the attachment portion 61 by an elbow 69 that permits rotational or pivotal movement of the duct. The elbow 69 may, if desired or necessary, be pivotably or rotationally attached to the attachment portion 61.

The apparatus 23 is useful as a self-contained fume extraction apparatus with or without the duct assembly 25. Without the duct assembly, the inlet 35 performs the function of the duct 67 and can be positioned proximate a workbench to extract fumes. Space savings are realized by providing the inlet 35 as an integral part of the base 29. By contrast, conventional self-contained fume extraction apparatus typically have a top or side opening that is connected to ductwork or tubing but does not extend to the bottom of the apparatus. The bases or bottoms of conventional self-contained fume extraction apparatus typically have no function other than to support the apparatus on a surface and add unnecessary volume to the apparatus.

As seen in FIGS. 3 and 4, the main components of the fume extraction apparatus assembly 21 are the base 29 and the top portion 31 of the housing 27, the motor 41, the blower assembly 43, the filter 45, the attachment portion 61 of the duct assembly 25, the duct 67, and the elbow 69. The base 29 and the top portion 31 are preferably made of a diecast aluminum, and the blower assembly 43 is preferably made of a plastic material.

In addition, the fume extraction apparatus assembly 21 preferably includes a mounting plate 73 for a PCB 75 that controls operation of the fume extraction apparatus 23. The mounting plate 73 preferably includes a hole 71 through which a shaft 77 of the motor 41 extends. The mounting plate 73 is preferably secured to the top portion 31, such as by bolts through a flange of the mounting plate, and the motor 41 is preferably secured to the mounting plate, such as by bolts.

An electrical connector 79 is mounted on the top portion 31 and electrically connected to the PCB 75 and is connectable to a power source (not shown). A user-operable switch 80 is preferably provided in a top of housing 27 and connected to the PCB 75 for starting and stopping the apparatus 23.

Between the inlet 35 and the filter 45, a pre-filter pad 81 is preferably provided for capturing larger particles and extending the life of the filter. The pad 81 is preferably an air-permeable sponge-type material. Particular materials for the pad 81 may be selected depending upon the anticipated uses of the fume extraction apparatus assembly 21. The pad preferably rests on a suitable support structure, such as a grid or a lip, at the opening 59 through the top side 33 of the base 29, so that the pad and filter are properly supported and positioned.

Figure 5:
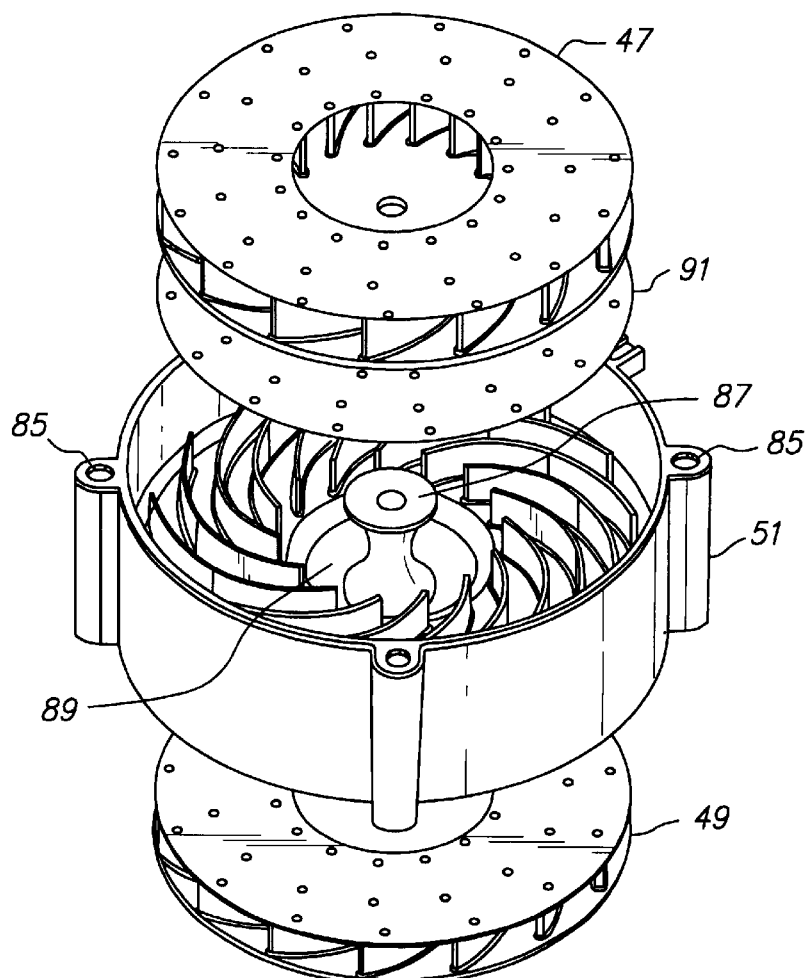
FIG. 5 is an exploded perspective view of components of a double-stage blower assembly according to an embodiment of the present invention.

The blower assembly 43 includes the intake impeller 47, the output impeller 49, and the diverter 51. The diverter 51 is preferably mounted to the mounting plate 73 by a plurality of bolts (not shown) attachable to threaded holes 85 on the periphery of the diverter. As seen in FIGS. 3–5, the intake impeller 47 and the output impeller 49 are preferably spaced relative to each other by a bushing 87 that extends through a central opening 89 (FIG. 5) in the diverter 51 and in which the shaft 77 of the motor 41 is received for driving the blower assembly. When assembled, the output and intake impellers 49 and 47 are disposed inside of a peripheral shell of the diverter 51. An impeller support 92 is mounted on the shaft 77 above the output impeller 49 to hold the impellers in a desired axial position relative to the shaft. A diverter plate 91 is disposed between the intake impeller 47 and the diverter 51 for capturing and focusing flow between the blades, and to distribute and direct air in the appropriate direction and minimize leakage.

A flow sensor 93 is preferably mounted on the diverter 51 and electrically connected to the PCB 75. The flow sensor 93 can be arranged to detect situations such as when flow proximate the diverter 51 drops below a certain level, which may be indicative of clogging of the filter 45, or exceeds a certain level, which may be indicative of other damage to the filter. The flow sensor 93 can send a signal to the PCB 75 to provide, for example, a warning signal, such as a light or an alarm, or to turn off the apparatus 23.

An intake plate 95 is preferably disposed above the filter 45 and below the intake impeller 47. The intake plate can assist in directing air into the intake impeller 47, and can support the top of the filter by abutting against a gasket on top of the filter. If desired or necessary, mounting connections such as bolt holes or brackets (not shown) can be provided for mounting the fume extractor apparatus 23 underneath workbenches or on walls.

Figure 6:
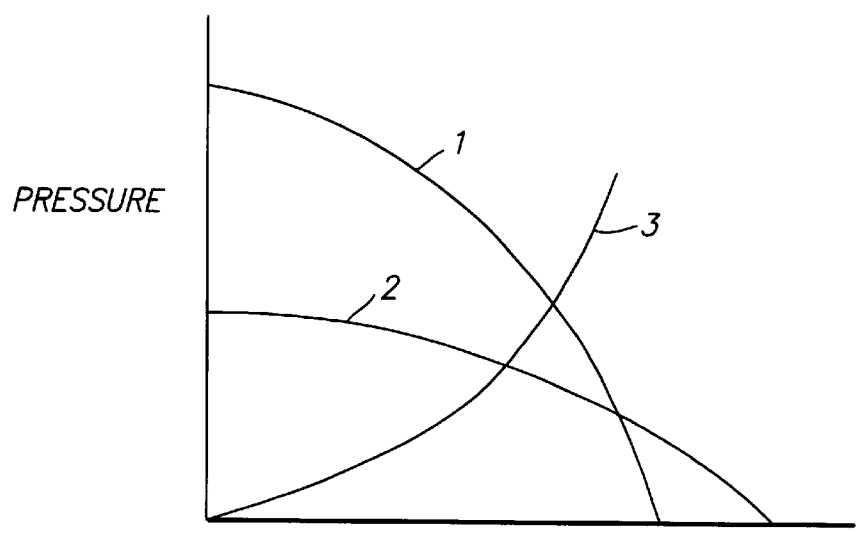
FIG. 6 is a pressure versus volume flow rate graph for two fume extractors across the same filter.

FIG. 6 is a pressure versus volume flow rate graph for two fume extractors across the same filter. The line numbered 1 represents typical pressures achievable at various volume flow rates using a two-stage impeller and a DC motor according to an embodiment of the present invention. The line numbered 2 represents typical pressures achievable at various volume flow rates using a conventional single-stage impeller and AC motor. The line numbered 3 is a filter pressure-volume curve that represents typical pressure drop at different volume flow rates across a filter of the type intended to be used with the fume extractor apparatus according to the present invention. It will be appreciated that various factors may affect the curves of the lines and the graph of FIG. 6 is only provided for purposes of illustrating concepts described textually herein. It will be seen from the graph of FIG. 6 that, in the volume flow ranges in which the fume extractor according to the present invention is intended to be operated, i.e., around 42–50 CFM, the fume extractor having features of the present invention can move a greater volume of air through the filter per unit time than the conventional fume extractor can move through the same filter.

While this invention has been illustrated and described in accordance with a preferred embodiment, it is recognized that variations and changes may be made therein without departing from the invention as set forth in the claims.

What is claimed is:

1. A self-contained, benchtop fume extraction and filter apparatus, comprising:
    a housing including a base and a top portion connected to a top side of the base, the base including an inlet in a side thereof, the inlet leading into the housing and in flow communication with an outlet in the top portion;
    a motor disposed in the housing;
    a blower assembly disposed in the housing and drivable by the motor to draw air into the inlet and cause the air to exit through the outlet;
    a filter disposed in the housing between the inlet and the outlet and arranged to filter air drawn in the inlet before the air exits through the outlet; and
    a duct assembly attachable at the inlet of the housing.

2. The apparatus of claim 1, wherein the apparatus is adapted to draw about 42–50 CFM of air into the inlet and across the filter, the filter being a HEPA and active carbon gas filter with a 2"H$_2$O pressure drop.

3. The apparatus of claim 2, wherein the apparatus produces no more than 53 dB at 0.5 m.

4. The apparatus of claim 3, wherein a volume of the apparatus is less than 1 ft$^3$.

5. The apparatus of claim 4, wherein a diameter of the blower assembly is about 575".

6. The apparatus of claim 2, wherein a volume of the apparatus is less than 1 ft$^3$.

7. The apparatus of claim 1, wherein the motor is a DC motor.

8. The apparatus of claim 7, wherein the blower assembly is a double-stage blower.

9. The apparatus of claim 1, wherein the base includes the top side on which the top portion is mounted, the top side defining a non-zero angle with a horizontal bottom side of the base, the filter having a centerline extending in an air flow direction from the inlet toward the outlet and being disposed in the top portion such that the centerline defines the non-zero angle with a perpendicular to the bottom side.

10. The apparatus of claim 1, wherein the inlet extends to a horizontal bottom side of the base.

11. A fume extraction and filter apparatus, comprising:
    a housing including a base and a top portion connected to a top side of the base, the base including an inlet in a side thereof, the inlet leading into the housing and in flow communication with an outlet in the top portion;
    a motor disposed in the housing;
    a blower assembly disposed in the housing and drivable by the motor to draw air into the inlet and cause the air to exit through the outlet;
    a filter disposed in the housing between the inlet and the outlet and arranged to filter air drawn in the inlet before the air exits through the outlet, wherein the blower assembly is a double-stage blower including an intake impeller and an output impeller, the intake impeller being closer to the inlet than the output impeller and the output impeller being closer to the outlet than the intake impeller.

12. A self-contained, benchtop fume extraction and filter apparatus assembly, comprising:
    a fume extraction and filter apparatus, including
        a housing including a base and a top portion connected to a top side of the base, the base including an inlet in a side thereof, the inlet leading into the housing and in flow communication with an outlet in the top portion,
        a motor disposed in the housing,
        a blower assembly disposed in the housing and drivable by the motor to draw air into the inlet and cause the air to exit through the outlet,
        a filter disposed in the housing between the inlet and the outlet and arranged to filter air drawn in the inlet before the air exits through the outlet; and
    a duct assembly attachable to the base.

13. The apparatus of claim 12, wherein the inlet extends to a horizontal bottom side of the base.

14. The apparatus of claim 13, wherein the duct assembly includes an attachment portion for attaching the duct assembly to the base and a duct movably attached to the attachment portion.

15. A fume extraction and filter apparatus assembly, comprising:
    a fume extraction and filter apparatus, including
        a housing including a base and a top portion connected to a top side of the base, the base including an inlet in a side thereof, the inlet leading into the housing and in flow communication with an outlet in the top portion,
        a motor disposed in the housing,
        a blower assembly disposed in the housing and drivable by the motor to draw air into the inlet and cause the air to exit through the outlet,
        a filter disposed in the housing between the inlet and the outlet and arranged to filter air drawn in the inlet before the air exits through the outlet; and
    a duct assembly attachable to the base,
    wherein the inlet extends to a horizontal bottom side of the base, wherein the duct assembly includes an attachment portion for attaching the duct assembly to the base, the attachment portion being attached to the base when the base is lowered vertically over the attachment portion such that the attachment portion is received entirely inside the inlet.

16. The apparatus of claim 15, wherein a size of the attachment portion is substantially equal to a size of the inlet.

17. A fume extraction and filter apparatus assembly, comprising:
    a fume extraction and filter apparatus, including
        a housing including a base and a top portion connected to a top side of the base, the base including an inlet in a side thereof, the inlet leading into the housing and in flow communication with an outlet in the top portion,
        a motor disposed in the housing,
        a blower assembly disposed in the housing and drivable by the motor to draw air into the inlet and cause the air to exit through the outlet, a filter disposed in the housing between the inlet and the outlet and arranged to filter air drawn in the inlet before the air exits through the outlet; and a duct assembly attachable to the base, wherein the inlet extends to a horizontal bottom side of the base, the duct assembly includes an attachment portion for attaching the duct assembly to the base and a duct movably attached to the attachment portion, and wherein the attachment portion is attached to the base when the base is lowered vertically over the attachment portion such that the attachment portion is received entirely inside the inlet.

18. The apparatus of claim 17, wherein a flow path of air through the filter is non-vertical.

19. A self-contained, benchtop fume extraction and filter apparatus, comprising:

a housing including a side wall having an inlet opening extending from a point above an open bottom of the housing to the bottom of the housing and an inlet leading into the housing and in flow communication with an outlet proximate a top of the housing;

a motor disposed in the housing;

a blower assembly disposed in the housing and drivable by the motor to draw air into the inlet and cause the air to exit through the outlet;

a filter disposed in the housing between the inlet and the outlet and arranged to filter air drawn in the inlet before the air exits through the outlet; and a duct assembly attachable at the inlet of the housing.

20. The apparatus of claim 19, wherein the apparatus is adapted to draw about 42–50 CFM of air into the inlet and across the filter, the filter being a HEPA and active carbon gas filter with a 2"H$_2$O pressure drop and has a volume of less than 1 ft$^3$.

21. The apparatus of claim 20, wherein the apparatus produces no more than 53 dB at 0.5 m.

22. A self-contained benchtop fume extraction and filter apparatus, comprising:

a housing including an inlet in a side thereof, the inlet leading into the housing and in flow communication with an outlet in the housing;

a motor disposed in the housing;

a blower assembly disposed in the housing and drivable by the motor to draw at least 42 CFM of air into the inlet and cause the air to exit through the outlet;

a filter disposed in the housing between the inlet and the outlet and arranged to filter air drawn in the inlet before the air exits through the outlet, wherein a volume of the apparatus is less than 1 ft$^3$; and a duct assembly attachable at the inlet of the housing.

23. The apparatus of claim 22, wherein the inlet extends to a horizontal bottom side of the housing.

24. A self-contained benchtop fume extraction and filter apparatus assembly, comprising:

a fume extraction and filter apparatus, including a housing including an inlet in a side thereof, the inlet leading into the housing and in flow communication with an outlet in the housing, a motor disposed in the housing, a blower assembly disposed in the housing and drivable by the motor to draw air into the inlet and cause the air to exit through the outlet, a filter disposed in the housing between the inlet and the outlet and arranged to filter air drawn in the inlet before the air exits through the outlet; and a duct assembly attachable to a bottom portion of the housing.

25. The assembly of claim 24, wherein the inlet extends to a horizontal bottom side of the housing.

26. The assembly of claim 24, wherein the duct assembly includes an attachment portion for attaching the duct assembly to the base and a duct movably attached to the attachment portion.

27. The assembly of claim 26, wherein a size of the attachment portion is substantially equal to a size of the inlet.

28. The assembly of claim 26, wherein the attachment portion is attachable to the housing when the housing is lowered vertically over the attachment portion such that the attachment portion is at least partially received inside the inlet.

29. The assembly of claim 24, wherein a flow path of air through the filter is non-vertical.

30. The assembly of claim 24, wherein a volume of the apparatus is less than 1 ft$^3$.

31. The assembly of claim 30, wherein the apparatus is adapted to draw at least 42 CFM of air into the inlet.

* * * * *